United States Patent [19]
Moser

[11] 3,894,141
[45] July 8, 1975

[54] PROCESS FOR REMOVING NITRIC OXIDE
[75] Inventor: William R. Moser, Westfield, N.J.
[73] Assignee: Exxon Research and Engineering Company, Linden, N.J.
[22] Filed: Dec. 27, 1972
[21] Appl. No.: 318,875

[52] U.S. Cl. .................................. 423/235; 423/351
[51] Int. Cl. ............................................. C01b 21/00
[58] Field of Search ........... 423/235, 351, 400, 402, 423/405, 236; 260/688; 208/101, 103

[56] References Cited
UNITED STATES PATENTS
| | | | |
|---|---|---|---|
| 2,656,395 | 6/1953 | Benson | 260/688 |
| 2,758,068 | 7/1956 | Howard | 208/101 |
| 3,428,414 | 2/1969 | Baum et al. | 423/235 |
| 3,635,657 | 1/1972 | Bressaw et al. | 423/235 |

FOREIGN PATENTS OR APPLICATIONS
| | | | |
|---|---|---|---|
| 197,510 | 1967 | U.S.S.R. | 423/235 |

OTHER PUBLICATIONS

AICHE Journal, Vol. 17, pgs. 265–271, Catalytic Reduction of NO with Various Hydrocarbons, Ault & Ayen.

Nitration of Hydrocarbons, A.V. Topchiev, 1959, pgs. 227–229.

Primary Examiner—Oscar R. Vertiz
Assistant Examiner—Eugene T. Wheelock
Attorney, Agent, or Firm—Joseph J. Allocca

[57] ABSTRACT

A process for removing No contaminants from an effluent waste stream deficient in oxygen, the process comprising the step of contacting said effluent with a liquid hydrocarbon at a pressure ranging from 1 to 1000 psia and at a temperature ranging from 0° to 500°C.

7 Claims, No Drawings

PROCESS FOR REMOVING NITRIC OXIDE

This invention relates to a process for reducing NO by hydrocarbons at mild temperatures. Another aspect of this invention relates to the liquid phase reduction of nitric oxide with a hydrocarbon under mild non-catalytic conditions.

The emphasis on ecology and more specifically the control of pollution in our environment has generated much interest in our determining how to eliminate NO contamination of our atmosphere. A plethora of prior art has been generated which teaches either the reduction of NO to molecular nitrogen or the oxidation to organo nitrates through the use of hydrocarbons which renders them in an innocuous form. For instance, it is known that nitric oxide reacts with ethane at temperatures above 550°C. J. Esser and K. J. Laidler, *Int. Journal of Chemical Kinetics*, Vol. II, 37–61 (1970).

Furthermore, it is known that the photooxidation of a large number of hydrocarbons by nitric oxide has been previously investigated. This technology is disclosed in an article published in the *Journal of Air Pollution Control Association*, Vol. 20, p. 239 (1970) authored by W. A. Glasson and C. S. Tuesday. Acrylonitrile was formed by a metal catalyzed reaction of propylene and nitric oxide at temperatures above 475°C. as described in U.S. Pat. No. 3,342,847 of J. M. Kruse. Nitric oxide has been known to be removed from coke oven gases by air oxidation to nitrogen dioxide followed by butadiene scrubbing as disclosed in U.S. Pat. No. 3,428,414, authored by W. H. Baum, J. G. Crist and E. V. Nagel. Finally, there have been other publications which have demonstrated that nitrogen dioxide was shown to be reactive towards hydrocarbons in solution and in the gas phase described in Nitration of Hydrocarbons and Other Organic Compounds, Pergamon Press, New York, 1959, pages 226–268, authored by A. V. Topchiev and the Journal of Organic Chemistry, 35, 3961 (1970) authored by J. F. Reed.

All of the processes suffer from one serious disadvantage in being employed for removing the NO contamination which emanates from stationary fuel burning processes. The NO contamination is contained in the combustion effluents from these processes and therefore the supply of oxygen is relatively limited. Furthermore, the injection of excess oxygen can be difficult and sometimes rather expensive.

The subject process removes this disadvantage in that it involves the facile reaction of nitric oxide with hydrocarbons in the absence of oxidants, catalysts, photoinduction or other such initiating molecules and results in the production of the innocuous nitrogen molecule as substantially the only gaseous product. Furthermore, the process has the advantage that the conditions required for reaction are relatively mild but can be extended over a broad range.

Briefly, this invention comprises the steps of reacting an NO containing stream with a liquid hydrocarbon at a temperature ranging between 0°C. and 500°C. and at a pressure ranging from 1 to 1000 lbs. per square inch absolute.

In order to aid in understanding the inventive concept the following supplementary disclosure is submitted.

The hydrocarbon compounds which can be used as starting material in the NO reduction process comprise the saturated straight chain aliphatics, the cycloaliphatics, the aromatics, the alkylated aromatics and the olefins (alkenes).

Illustrative hydrocarbons include paraffins having from 3 to 30 carbon atoms, the propanes, butanes, hexanes, heptanes, octanes, nonanes, decanes, undecanes, dodecanes and their higher homologs; cyclopropanes, cyclobutanes, cyclopentanes, cyclohexanes, cycloheptanes, cyclooctanes, and their higher cyclic homologs; toluene, xylene, ethylbenzene, propylbenzene, tetralin, mesitylene, cumene, durene and the like; isomeric alkylated hydrocarbons, para-xylene, meta-xylene, ortho-xylene, ethylbenzene; isomeric saturated alkanes, n-hexane, 2,3-dimethylbutane, 2,2-dimethylbutane, 2-methylpentane, 3-methylpentane, n-octane, 2,2,4-trimethylpentane, 2,3,4-trimethylpentane, 2,4-dimethylhexane, 3-methylheptane and the like; olefins containing from 2 to 30 carbon atoms, propene, butenes, pentenes, cyclohexenes, cycloheptenes, cyclooctenes and higher homologs and higher alkylated homologs; aromatic olefins, cis- and trans-stilbene, styrene and the like.

The most preferred hydrocarbon compounds for reasons of availability and ease of nitro reduction are those alkylated aromatic hydrocarbons containing 7 to 25 carbon atoms which include cycloheptanes, cyclooctanes, toluene, xylene, ethylbenzene, propylbenzene, tetralin, mesitylene, para-xylene, 2,3-dimethylbutane, 2,3,4-trimethylpentane, cyclohexenes.

It is also to be understood that these hydrocarbons could be admixed with other constituents.

It has also been shown that crude oil residua, as well as motor oil base stocks react, but more slowly than the other hydrocarbons mentioned, and often times mixed with a solvent to make them liquid.

Based upon considerable experimentation, it is possible to disclose workable and preferred parameters in terms of volumes of the liquid hydrocarbons that are contacted per unit time with the gaseous NO compounds and the ratio of the hydrocarbon to the NO concentration of the effluent in the various streams emanating from stationary sources, as well as mobile sources.

The reaction must be run in the presence of a liquid hydrocarbon such as those enumerated hereinabove.

The reaction can be run in the presence of an inert gaseous diluent such as nitrogen, neon, argon and the like.

In running these systems, the following parameters hold: the mole ratio of hydrocarbon to NO ranges from 500 to 0.04. Lower mole ratios give low rates of reaction over the temperatures of 0° to 500°C and are therefore unsatisfactory. Higher ratios are generally more costly. Mole ratios of 10 to 0.5 volumes of hydrocarbon for each mole of nitric oxide give good results and hence, are preferred.

Higher flow rates may accelerate the rate of reaction at a given temperature since they may increase the quantity of NO brought into contact with the hydrocarbon substrate.

However, flow rates of effluent gases between about 0.1 to 25 volumes per minute per volume of liquid hydrocarbon have been successfully employed while the best results have been obtained with flow rates per unit time from about 0.5 to 5 volumes per minute per volume of hydrocarbon compound. The flow rate of gases used ordinarily depend upon the quantity of hydrocarbon compound, the size of the reactor, the pressure and the rate of mixing of liquid and gas phases.

Utilizing reaction temperatures and reaction times as indicated previously, good rsults have been obtained with reaction temperatures ranging between 0° and 500°C. Lower temperatures give little or no reaction particularly with a more sluggishly reactive saturated aliphatic while higher temperatures give rise to compounds which are not particularly desired when the more reactive olefins are used as substrates. The reasonable balance between reaction rate and quality of produce can usually be obtained at temperatures ranging between about 100° and 310°C and for these reasons this represents a preferred operating temperature range.

The reaction time is a variable dependent upon the activity of the particular hydrocarbon compound employed, the mole ratio of nitric oxide to the hydrocarbon compound, the nitric oxide pressure over the hydrocarbons, the flow rate, the mixing rate and the reaction temperature. Ordinarily the reaction produces molecular nitrogen and organic nitro-compounds immediately Ordinarily, can require as long as several days when the more recalcitrant paraffins are the substrates.

In summary, it might be said that the process by which the invention may be practiced involves either passing the exhaust effluent gases containing the NO contaminants through the liquid hydrocarbon or preferably compressing the gases above the reacting liquid hydrocarbon. This process has the advantage that nitric oxide is not only converted to the innocuous molecule nitrogen but that the other products contain alkyl nitrates and nitroalkanes which may be blended with the fuel for the combustion apparatus leading to an upgrading of that fuel. The most efficient process is where the liquid hydrocarbon is fuel for the combustion process.

In order to describe the working of the invention, the inventive process is described in the following illustrative examples.

EXAMPLE 1

Undecane was passed through alumina and degassed by three freeze-thaw cycles on the vacuum line. Then 0.150 mole of this compound was added to a stirred, glass pressure reactor and degassed again at 165° by 50 argon pressurization-depressurization cycles between 0 to 80 psi. The gas was replaced with pure nitric oxide (passed through Linde 13X molecular sieves to remove traces of $NO_2$) at a pressure of 80 psi. After nitric oxide saturation of the liquid, the rate of nitric oxide disappearance, in the dark, followed second order dependence with a specific rate factor of $(3.36 \pm 0.07) \times 10^{-4}$ $atm^{-1}$-$sec^{-1}$. After 85% reaction of the nitric oxide, a gas analysis showed that 0.31 mole of molecular nitrogen was produced per mole of nitric oxide consumed. Hydrogen cyanide and nitrous oxide were not detected. Infrared analysis of the final liquid, after reaction with 14.5 mmoles of nitric oxide, showed a strong bond at 6.42 $\mu$ indicating the presence of an alkyl nitrate product.

This example shows that nitric oxide can be decomposed by hydrocarbons in the liquid phase under mild conditions not requiring metal catalysis, photo-induction, prior conversion to $NO_2$ or initiation by other molecules, and that nitrogen, a non-toxic gas is produced. Other common toxic gases were not formed, e.g. HCN, CO.

EXAMPLE 2

Toluene (0.749 mole) was passed through alumina, degassed and allowed to react with nitric oxide at an initial pressure of 80 psi in an autoclave at 150°C. Over a period of 140 minutes, 70.6 mmoles of nitric oxide was consumed. The experimental rate constant for gas phase nitric oxide depletion was $(0.60 \pm .02) \times 10^{-4}$ $atm^{-1}$ -$sec^{-1}$. Molecular nitrogen was the only gaseous product. Distillation of the liquid product afforded benzyl nitrate, and benzoic acid anhydride in yields of 60 and 18% respectively based on the amount of nitric oxide consumed by the liquid phase. The distillate contained a 5% combined yield of benzaldehyde and benzylalcohol. The structure of the organic nitrate was proved by the observation of a mass spectral parent ion peak at m/e-153, infrared absorption at 6.43 $\mu$, and nmr peaks at 5.1 $\delta$ (2H) and 7.2 $\delta$ (5H). Varying yields of ca. 15% of $\alpha$-nitrotoluene were observed.

Nitric oxide was shown not to react with toluene in the gas phase at a detectable rate under the same conditions of temperature and pressure.

This example shows that alkyl aromatics readily decompose nitric oxide to nitrogen and products that contain mainly alkyl nitrates, and that the liquid phase reaction is substantially favored over the gas phase reaction.

EXAMPLE 3

Purified and degassed cyclohexene (20 ml) was stirred in a glass autoclave in the dark at 25°C under nitric oxide at 80 psi initial pressure. Over a period of 17 minutes 14.6 mmoles of nitric oxide were consumed. Molecular nitrogen was the sole gaseous product.

This example demonstrates that selected hydrocarbons can decompose nitric oxide at especially low temperatures and that olefinic compounds react especially fast.

EXAMPLE 4

Mesitylene (20 ml) was heated at 150°C and allowed to react with nitric oxide at a partial nitric oxide pressure of 343 torr. Over a period of 150 min. molecular nitrogen was generated and the nitric oxide was depleted to 171 torr.

This example shows that hydrocarbons will decompse nitric oxide at less than atmospheric pressures.

EXAMPLE 5

Purified and degassed 2,3-dimethylbutane (40 ml) was allowed to react with pure nitric oxide at 150 psi pressure and 130°C. G.C. analysis of the gaseous and liquid products showed that 80% of the nitrogen contained in the starting nitric oxide was converted to molecular nitrogen and 20% was converted to 2-nitro-2,3-dimethylbutane.

This example demonstrates that the bulk of the nocuous nitric oxide molecular is converted to the innocuous molecular nitrogen upon reaction with a hydrocarbon.

What is claimed is:

1. A process for removing nitric oxide from a gaseous effluent combustion waste stream deficient in oxygen, the process comprising the steps of contacting said effluent with a liquid hydrocarbon at a pressure sufficient to maintain the hydrocarbon in the liquid state, at a temperature ranging from 100° to 310°C and at a mole ratio of hydrocarbon to NO ranging from 500:1 to 0.04:1.

2. A process according to claim 1 wherein said hydrocarbon is paraffin containing from 3 to 30 carbon atoms.

3. A process according to claim 1 wherein said hydrocarbon is an alkyl aromatic containing 7 to 25 carbon atoms.

4. A process according to claim 1 wherein said hydrocarbon is an olefin containing from 2 to 30 carbon atoms.

5. A process according to claim 1 wherein the pressure in the reaction vessel is maintained between 10 to 80 spi of nitric oxide over the liquid hydrocarbon.

6. A process according to claim 1 further involving the step of feeding the liquid hydrocarbon after contacting to a combustion process as a fuel.

7. A process according to claim 1 wherein said liquid hydrocarbon is one selected from the group consisting of cycloheptanes, cyclooctanes, toluene, xylene, ethylbenzene, propylbenzene, tetralin, mesitylene, para-xylene, 2,3-dimethylbutane, 2,3,4-trimethylpentane and cyclohexenes.

* * * * *